United States Patent [19]

Kobetz et al.

[11] 3,867,440

[45] Feb. 18, 1975

[54] PROCESS FOR THE PREPARATION; OF GLYCOLIC ACID

[75] Inventors: Paul Kobetz; Kenneth L. Lindsay, both of Baton Rouge, La.

[73] Assignee: Ethyl Corporation, New York, N.Y.

[22] Filed: Aug. 28, 1972

[21] Appl. No.: 284,226

[52] U.S. Cl............................................ 260/535 R
[51] Int. Cl............................................. C07c 59/06
[58] Field of Search ............................... 260/535 R

[56] References Cited
FOREIGN PATENTS OR APPLICATIONS
472,260    3/1951    Canada............................... 260/535

Primary Examiner—Lorraine A. Weinberger
Assistant Examiner—Paul J. Killos
Attorney, Agent, or Firm—Donald L. Johnson; John F. Sieberth; Shelton B. McAnelly

[57] ABSTRACT

It is disclosed that glycolic acid is readily produced in high yield by hydrolyzing glycolonitrile with an acid having a $pK_a$ of from about 1.5 to about 2.5, typically $H_3PO_3$ or $H_2SO_3$, at a temperature of from about 75 to about 175°C. Typically, the glycolonitrile is produced by reacting HCN and formaldehyde.

9 Claims, No Drawings

PROCESS FOR THE PREPARATION; OF GLYCOLIC ACID

BACKGROUND OF THE INVENTION

1. Field of the Invention

The invention relates to the preparation of glycolic acid from glycolonitrile.

2. Description of the Prior Art

The production of glycolic acid from glycolonitrile has been attempted by hydrolysis using various strong acids and basis; however, the reaction has not previously been found to go well. In basic solutions as well as in strong acid solutions various undesired by-products are obtained as well as poor yields and decompositions, some of which are explosive.

SUMMARY OF THE INVENTION

It has been discovered that glycolonitrile is readily hydrolyzed to produce glycolic acid in high yield by reaction of the glycolonitrile with an acid having a $pK_a$ of from about 1.5 to about 2.5, preferably from about 1.7 to about 2.1, more preferably from about 1.8 to about 2.0, particularly $H_3PO_3$ or $H_2SO_3$. At moderate temperatures and in reasonable reaction times, virtually 100 percent conversion to glycolic acid is obtained with little, if any, by-products being produced other than the ammonium salt of the acid used in hydrolysis.

$H_3PO_3$ and $H_2SO_3$ are preferred acids that meet the $pK_a$ requirements, since they have $pK_a$'s of 1.80 and 1.76, respectively. Another suitable acid is maleic acid which has a $pK_a$ of 2.00. In the case of maleic acid, however, the yields are not as good as with $H_3PO_3$ and $H_2SO_3$ and some of the maleic acid is converted to fumaric acid. Typical yields with maleic acid are 30–70 percent glycolic acid.

The acids used in hydrolysis are suitably fed either as such or are generated in situ. For example, it is possible to feed $SO_2$ to an aqueous hydrolysis system to generate $H_2SO_3$. Similarly, one can feed $P_2O_3$ to generate phosphorous acid in situ.

Recovery of the product glycolic acid may be accomplished in any suitable way; for example, by continuous extraction with any suitable solvent or combination of solvents. A typical solvent is methyl isobutyl ketone. Other recovery procedures are ion exchange and precipitation of calcium salts. In many instances, the glycolic acid product system is used directly in chemical reactions without prior recovery operations or separation of the glycolic acid from the ammonium salt of the hydrolysis acid. Thus, the combined effluent from a $H_2SO_3$ hydrolysis accomplished by feeding $SO_2$ can be heated to vaporize off excess $SO_2$, following which lime is added to precipitate insoluble calcium sulfite. This produces a basic solution from which ammonia boils out and the ammonia thus obtained may be used in any conventional way, typically recycle to an HCN plant to produce additional HCN for reaction with formaldehyde to produce the glycolonitrile used in the hydrolysis. Such an arrangement provides a highly desirable cyclic process for producing glycolic acid derivatives from formaldehyde and ammonia.

The present reaction of glycolonitrile and acid is preferably conducted in an aqueous system containing from about 10 to about 70 percent by weight of the reactants.

| Acid | pKa (−log $K_1$) |
|---|---|
| Fumaric | 3.03 |
| Maleic | 2.00 |
| Phosphorous | 1.80 |
| Sulfurous | 1.76 |
| Sulfuric | 0.4 |

In accordance with the present invention a process is provided for hydrolyzing glycolonitrile to produce glycolic acid which comprises reacting glycolonitrile with an acid having a $pK_a$ of from about 1.5 to about 2.5 in an aqueous solution at a temperature of from about 75° to about 175°C to form glycolic acid and an ammonium salt of the reacted acid.

Preferred acids for use in the present process are $H_3PO_3$ and $H_2SO_3$ which have $pK_a$'s of 1.80 and 1.76, respectively.

In a preferred aspect of the present invention, a reaction of glycolonitrile with acid is performed at a temperature of from about 100° to about 160°C, more preferably at a temperature of from about 140° to about 150°C.

In another aspect of the present invention there is provided a process for producing glycolic acid from formaldehyde and HCN in which the formaldehyde and HCN are reacted to produce glycolonitrile which in turn is reacted with an acid having a $pK_a$ of from about 1.5 to about 2.5 in an aqueous solution to form glycolic acid and ammonium salt of the acid reacted with glycolonitrile. In this aspect of the invention the glycolic acid is then recovered from the reaction product. Preferably, the HCN and formaldehyde are reacted at a temperature of from about 0° to about 100°C. to produce the glycolonitrile. The glycolonitrile and acid are then reacted under conditions set forth in the foregoing.

In a preferred aspect of the present invention the acid and glycolonitrile are reacted in proportions of from about 1 to about 2 times the stoichiometric amount of acid required for reaction with the glycolonitrile. Preferably the ratio is from about 1.1 to about 1.5 times the stoichiometric amount.

Preferred acids having a $pK_a$ from about 1.5 to about 2.5 are $H_3PO_3$ and $H_2SO_3$. In general, the former is preferred for ease and convenience of reaction whereas the latter is preferred in instances where low cost is an important consideration.

The following examples indicate preferred embodiments of the present invention.

EXAMPLE I

One-half gram of glycolonitrile and 0.95 gram of phosphorous acid $H_3PO_3$ were added to a small tube of approximate volume of 4 mls. Then 1 ml of water was added and the tube sealed. The contents were heated at 150° to 160° for 1 hour. NMR analysis showed nearly quantitative conversion to glycolic acid.

EXAMPLE II

Seven grams of glycolonitrile, 12 grams of phosphorous acid and 50 cc of water were added to a 125 ml flask fitted with a condenser and the flask was heated to reflux at 95°C. After 8 hours, 45 mol percent of the glycolonitrile was converted to glycolic acid. After 16 hours approximately 72 mol percent of the glycolonitrile was converted to glycolic acid and after approximately 30 hours about 98 mol percent of the glycolonitrile was converted to glycolic acid.

EXAMPLE III

In a comparative run, one-half gram of glycolonitrile, approximately 1 gram of sulfuric acid and 1 ml of water were added to a tube. The tube was sealed and heated to 150° to 160°C for 1 hour. The contents turned brown showing decomposition. The tube was cooled to room temperature. When the tip was broken, the contents exploded showing decomposition.

EXAMPLE IV one-tenth mol of maleic acid, 0.15 mol of glycolonitrile and 30 cc of water were heated to reflux in a 125 ml flask fitted with a condenser. After 20 hours, approximately 39 mol percent of the glycolonitrile was converted to glycolic acid and 50 percent of the maleic acid was converted to fumaric acid. There was no significant change after an additional 8 hours of heating.

EXAMPLE V

In a comparative run, 2/10 mol of fumaric acid and 1/10 mol of glycolonitrile and 50 cc of water were heated at reflux for 8 hours. No reaction occurred.

We claim:

1. A process for hydrolyzing glycolonitrile to produce glycolic acid which comprises reacting glycolonitrile with an acid selected from the group consisting of maleic acid, phosphorous acid and sulfurous acid at a temperature of from about 75° to about 175°C to form glycolic acid and an ammonium salt of the acid reacted with the glycolonitrile.

2. The process of claim 1 wherein maleic acid is reacted with glycolonitrile.

3. The process of claim 1 wherein the acid is reacted with the glycolonitrile in proportions of from about 1 to about 2 times the stoichiometric amount of acid required for reaction with the glycolonitrile.

4. The process of claim 1 wherein $H_3PO_3$ is reacted with glycolonitrile.

5. The process of claim 1 wherein $H_2SO_3$ is reacted with glycolonitrile.

6. The process of claim 1 wherein the reaction is performed at a temperature of from about 100° to about 160°C.

7. The process of claim 1 wherein the reaction is performed at a temperature of from about 140° to about 150°C.

8. The process of claim 1 wherein the acid is $H_2SO_3$ and it is reacted with the glycolonitrile in proportions of from about 1 to about 2 times the stoichiometric amount of acid required for reaction with the glycolonitrile.

9. The process of claim 1 wherein the acid is reacted with the glycolonitrile in proportions of from about 1.1 to about 1.5 times the stoichiometric amount of acid required for reaction with the glycolonitrile.

* * * * *

PO-1050
(5/69)

UNITED STATES PATENT OFFICE
CERTIFICATE OF CORRECTION

Patent No. 3,867,440            Dated February 18, 1975

Inventor(s) Paul Kobetz and Kenneth L. Lindsay

It is certified that error appears in the above-identified patent and that said Letters Patent are hereby corrected as shown below:

Column 2, line 1, insert the following:

--     $pK_a$'s of Various Acids (From Lange's Handbook of Chemistry, revised 10 ed., McGraw-Hill (1969), page 1209-1213.) -- .

Column 3, line 15, reads "one, should read -- One --.

Signed and sealed this 29th day of April 1975.

(SEAL)
Attest:

RUTH C. MASON
Attesting Officer

C. MARSHALL DANN
Commissioner of Patents
and Trademarks